(12) United States Patent
Oriet et al.

(10) Patent No.: US 8,065,800 B2
(45) Date of Patent: Nov. 29, 2011

(54) METHOD OF ASSEMBLING A MODULAR REAR AXLE ASSEMBLY OF A MOTOR VEHICLE

(75) Inventors: Leo P. Oriet, Rochester Hills, MI (US); Jules Cazabon, Staples (CA); Nouri Matar, Windsor (CA)

(73) Assignee: Navistar Canada, Inc. (CA)

( * ) Notice: Subject to any disclaimer, the term of this patent is extended or adjusted under 35 U.S.C. 154(b) by 14 days.

(21) Appl. No.: 12/795,875

(22) Filed: Jun. 8, 2010

(65) Prior Publication Data

US 2010/0236042 A1 Sep. 23, 2010

Related U.S. Application Data

(62) Division of application No. 12/102,433, filed on Apr. 14, 2008, now Pat. No. 7,779,949.

(51) Int. Cl.
*B21D 39/00* (2006.01)
*B62D 53/06* (2006.01)

(52) U.S. Cl. ............... 29/897.2; 29/402.03; 29/402.08; 29/426.1; 29/525.01; 29/525.02; 180/209; 280/800; 280/124.109

(58) Field of Classification Search ............... 29/897.2, 29/402.01, 402.03, 402.08, 525.01, 525.02, 29/525.11, 426.1; 180/209; 280/800, 124.109, 280/149.2

See application file for complete search history.

(56) References Cited

U.S. PATENT DOCUMENTS

| | | | |
|---|---|---|---|
| 4,955,629 A | 9/1990 | Todd et al. | |
| 4,958,845 A | 9/1990 | Parks | |
| 5,378,006 A | 1/1995 | Stuart et al. | |
| 5,460,397 A | 10/1995 | Shielman | |
| 5,860,668 A | 1/1999 | Hull et al. | |
| 6,199,894 B1 * | 3/2001 | Anderson | 280/638 |
| 6,592,140 B1 | 7/2003 | Alguera Gallego et al. | |
| 7,658,397 B2 | 2/2010 | Mattson | |

* cited by examiner

*Primary Examiner* — Jermie Cozart
(74) *Attorney, Agent, or Firm* — Jeffrey P. Calfa; Mark C. Bach

(57) ABSTRACT

A rear axle/suspension module (18) is associated with a chassis frame (10) in a way that facilitates installation and removal to provide more efficient assembly plant operations with fewer parts and less floor space. Also provided is a method of re-equipping a truck that has one particular model of drive axle and suspension module with a different model.

5 Claims, 2 Drawing Sheets

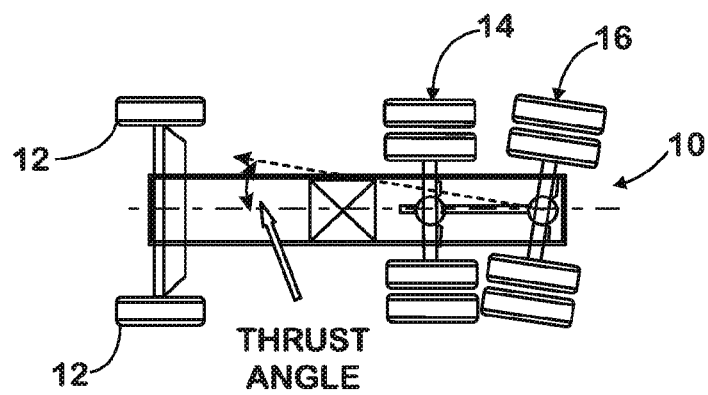
PRIOR ART  FIGURE 1
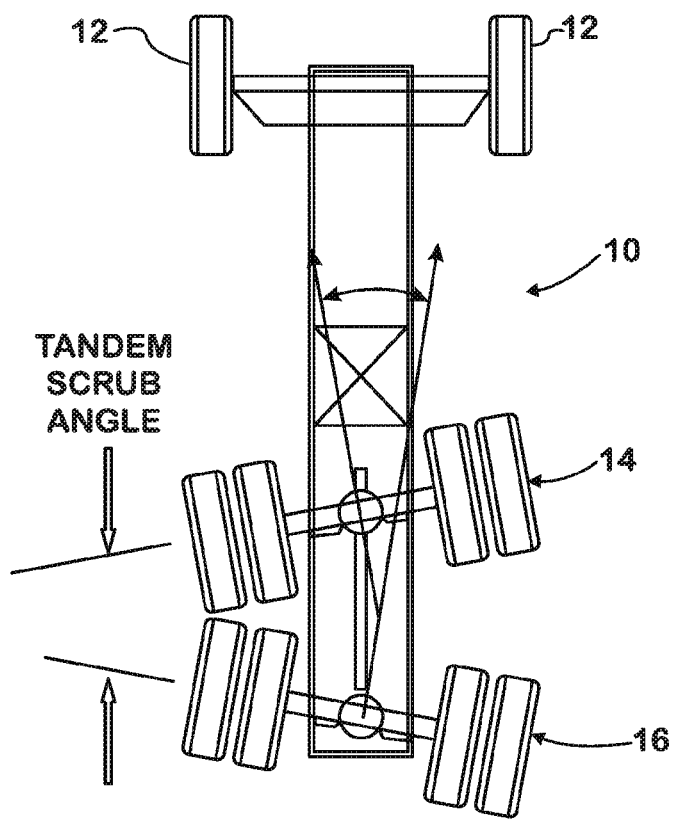
PRIOR ART  FIGURE 2

METHOD OF ASSEMBLING A MODULAR REAR AXLE ASSEMBLY OF A MOTOR VEHICLE

REFERENCE TO RELATED APPLICATIONS

This application claims priority from and is a division of application Ser. No. 12/102,433, filed on Apr. 14, 2008 now U.S. Pat. No. 7,779,949.

FIELD OF THE INVENTION

This invention relates to motor vehicles, especially large trucks, and in particular it relates to a modular rear axle assembly of such a vehicle.

BACKGROUND OF THE INVENTION

A typical construction for a large truck is based on a steel chassis frame. A cab for the driver is mounted atop the frame. An engine is mounted on the frame in front of the cab. Various components of a drivetrain that couples the engine to driven wheels of a rear axle assembly are supported on the frame, as are components of various other systems such as brake and steering systems. In the case of a highway tractor, a fifth wheel is mounted atop the rear of the frame.

One or more rear drive axles are suspended from the chassis frame by a suspension system that comprises various components that provide resiliency in conjunction with damping. The spring/damping characteristic of a suspension system is typically selected to provide desired ride and handling for a particular vehicle use vocation, and is based on the mass of the truck and the maximum load that the truck carries. Truck suspension systems often include components whose characteristics are adjustable in order to better adapt the truck to different load masses.

Assembly of axles, especially tandem axles, to chassis frames requires manufacturing processes that can assure proper alignment. In an assembly line process, some trucks will have more precise alignment than others due to tolerance variations. Imprecise alignment of the rear axle of a tandem axle can create an off-center thrust angle, a condition sometimes referred to as "dog tracking", that a driver corrects by turning the steering wheel off-center. This contributes to steering wheel misalignment and leads to accelerated tire wear. The presence of a scrub angle between front and rear axles of a tandem axle is another undesired condition.

Trucks are typically manufactured by fastening individual components to a chassis frame using various brackets, cross members, and fasteners. Large numbers of holes have to be drilled in side rails of the chassis frame. Such a manufacturing process is typically part- and labor-intensive. It also requires a number of different assembly stations for which ample floor space in an assembly plant is required.

Certain trailers of the type that are hauled by highway tractors have rear axle modules, sometimes referred to as bogies, or sliders, that contain multiple axles and various suspension components that mount the axle(s) on a structure that is itself fastened to the underside of the trailer body. The use of a modular axle assembly in trailer manufacture can provide certain manufacturing efficiencies because of fewer operations and the ability to better align each axle to the other in the module, and they are assembled in significantly smaller main line workstations that are 12'×12', more or less, rather than 12'×50', more or less, often found in conventional highway tractor main line workstations. This results in considerable manufacturing labor and floor space savings.

SUMMARY OF THE INVENTION

The inventors believe that a truck manufacturing process can be improved by designing a truck to have a rear axle module that is assembled as a unit to a chassis frame. Such a module can be designed to provide desired characteristics, such as strength, alignment consistent with those of the chassis frame, while using fewer parts and fewer main line assembly stations in the overall highway tractor manufacturing process.

A smaller amount of floor space and fewer assembly operations are needed in a truck manufacturing plant for assembling a rear axle assembly to a chassis frame when the assembly embodies principles of the present invention. Because of the ability to align the axles in the module away from the truck into which the module is to be assembled, not only can the axle-to-axle alignment be more precise than if individual axles and their suspensions are installed on a chassis frame, but less complicated alignment procedures are required in the truck assembly plant because the axles are already pre-aligned in the module. These factors can significantly improve manufacturing efficiency and product quality while reducing in-plant manufacturing costs.

The replacement of multiple-part and shim-adjusted rear suspension systems currently seen in trucks by the new modular rear axle assembly embodying fixed length tie rods on one side and threaded lockable turnbuckles on the other side can provide a precisely aligned, sturdier chassis construction that possesses better steering wheel and tire alignment and delivers better road handling performance. Because a truck that embodies principles of the invention is expected to incur fewer alignment and suspension issues, manufacturer warranty costs should be less and customer satisfaction should be enhanced.

Furthermore, the inventive module can be implemented in existing commercial truck and bus product offerings without major chassis modifications. It can also be produced in various models that differ in types of suspension and/or in the axles themselves to accommodate various highway tractor vocations. Such models can be designed to fit various truck chassis frames if those frames have the same size right and left frame rails and the same width.

While the ability to efficiently assemble such a module to a chassis frame also provides for efficient disassembly for service when needed, it also provides module interchangeability. As such it affords truck manufacturers and truck dealers a new business opportunity by enabling an existing truck that would be meet a prospective customer's need except for its particular drive axle(s) to be quickly adapted to meet the customer's requirement by replacing the rear axle module on the truck with one that the customer needs. By stocking different rear drive module models in inventory, a manufacturer or dealer can quickly adapt an already manufactured truck and make an immediate sale or lease that otherwise might not be made.

Accordingly, one generic aspect of the invention relates to a chassis frame and rear axle module combination.

The chassis frame comprises right and left side rails often referred to as frame rails that run lengthwise of the chassis frame and that comprise respective channels each of which has an interior bounded by a vertical wall and horizontal top and bottom flanges that extend from top and bottom of the vertical wall toward corresponding flanges of the opposite side rail.

The rear axle module comprises right and left channels each of which has an interior bounded by a horizontal wall that is disposed against the bottom flange of a respective one of the right and left side rails and inner and outer vertical flanges that extend from the respective horizontal wall and are disposed respectively against free ends of the flanges of the respective side rail and the vertical wall of the respective side rail.

Right and left fillers respectively fill the interior of the respective side frame rail between the inner vertical flange of the respective module channel and the vertical wall of the respective side rail.

At least four fasteners fasten each rear module channel to the respective side rail channel to place the respective side rail channel and filler in horizontal compression.

A further generic aspect of the invention relates to a method of assembling an axle module to a chassis frame that has right and left side rail channels running lengthwise of the chassis frame, each channel having an interior bounded by a vertical wall and horizontal top and bottom flanges that extend from top and bottom of the vertical wall toward corresponding flanges of the opposite side rail.

The method comprises filling the interiors of the side rails with fillers and positioning right and left channels of the axle module below the right and left side rails respectively and relatively moving the module and frame toward each other to cause an interior of each channel of the module that is bounded by a bottom wall and inner and outer upright flanges to fit to the corresponding side rail with the bottom wall of each module channel being disposed against the bottom flange of the corresponding side rail and with the inner flange of each module channel disposed against free ends of the flanges of the respective side rail and the corresponding filler and with the outer flange of each module channel disposed against the vertical wall of the respective side rail.

The method further comprises fastening each module channel to the respective side frame rail channel to place the respective side rail channel and filler in horizontal compression.

Another aspect of the invention relates to a method of re-equipping a truck that has one particular model of rear drive axle and suspension module with a different model. The highway tractor is designed in such a way that it facilitates quick disconnection from the rear axle module. This includes and is not limited to electrical, pneumatic and hydraulic logic and control circuits.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1 is a top plan diagrammatic view of a chassis frame showing a non-zero thrust angle.

FIG. 2 is a top plan diagrammatic view of a chassis frame showing a scrub angle for a tandem axle.

DESCRIPTION OF THE PREFERRED EMBODIMENT

Figure 3:
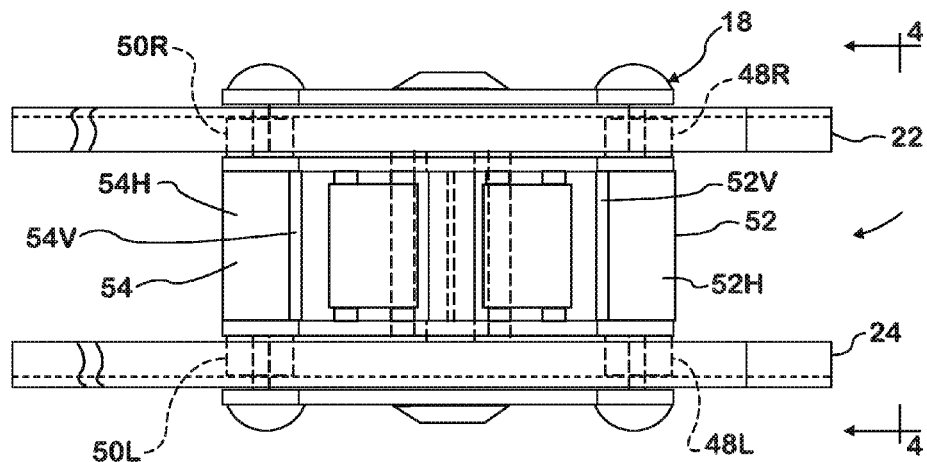
FIG. 3 is a top plan view a chassis frame with a modular rear axle assembly in accordance with principles of the present invention.

FIG. 1 shows a truck chassis 10 having steered wheels 12 at the front and tandem drive axles 14, 16 at the rear. The drawing shows the rear tandem axle 16 in a condition of misalignment relative to axle 14 creating a non-zero, or off-center, thrust angle, that causes the condition referred to as "dog tracking". As discussed earlier, this condition contributes to steering wheel misalignment because the driver must over- or under-steer to correct for it, and the condition leads to accelerated tire wear.

FIG. 2 shows the presence of a scrub angle (marked as such) between the front and rear tandem drive axles due to axle 14 being misaligned toward the left of the chassis frame centerline and axle 16 being misaligned toward the right. This condition also creates drivability and wear issues.

Figure 4:
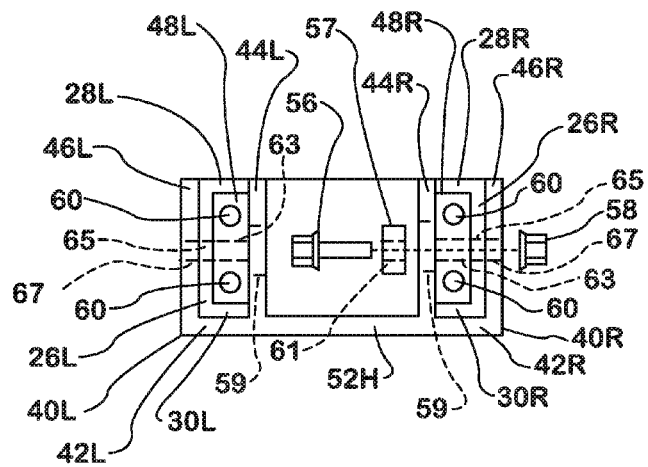
FIG. 4 is an end view in the direction of arrows 4-4 in FIG. 3.

The inventive drive axle module 18 and its association with chassis frame 10 are presented in FIG. 3 (top view) and FIG. 4 (end view).

Frame 10 comprises right and left side rails 22, 24 running lengthwise of the frame and comprising respective steel channels. As particularly seen in FIG. 4, each channel has an interior bounded by a respective vertical wall 26R, 26L, a respective horizontal top flange 28R, 28L, and a respective horizontal bottom flange 30R, 30L. The channel interiors confront each other across the width of the frame, with the flanges of each extending from the top and bottom of the respective vertical wall 26R, 26L toward corresponding flanges of the opposite channel. Frame 10 comprises one or more cross members (not shown) at other locations along the frame length.

Module 18 comprises a sub-frame structure for association with side rails 22, 24, and suspension components that couple tandem drive axles (not shown) to that structure. When the sub-frame structure is associated with and fastened to frame 10, the tandem drive axles are inherently placed in proper alignment with the chassis.

The sub-frame structure that associates with frame 10 comprises right and left channels 40R, 40L. Each channel has an interior bounded by a respective horizontal wall 42R, 42L that is disposed against the respective bottom flange 30R, 30L of the respective side rail 22, 24. Each channel 40R, 40L further comprises a respective inner vertical flange 44R, 44L and a respective outer vertical flange 46R, 46L. Each inner and outer flange pair extend upward from the respective horizontal wall 42R, 42L. The inner flanges are disposed against free ends of the flanges of the side rails, and the outer flanges are disposed against the outer faces of the vertical walls of the side rails.

A pair of substantially incompressible fillers 48R, 50R fill the channel interior of frame side rail 22 at opposite ends of module channel 40R. The fillers are disposed between the inner vertical flange of the respective module channel and the vertical wall of the respective side rail. A pair of substantially incompressible fillers 48L, 50L fill the channel interior of frame side rail 24 at opposite ends of module channel 40L. They too are disposed between the inner vertical flange of the respective module channel 40L and the vertical wall of the respective side rail 24.

At lengthwise ends of the module, two bridges 52, 54 span the space between the axle module channels 40R, 40L to join those channels together. Each bridge comprises a respective flat horizontal wall 52H, 54H and a respective flat vertical wall, 52V, 54V. Each horizontal wall 52H, 54H joins with each module channel at the junction of the channel's inner vertical flange and the channel's horizontal bottom wall. Each vertical wall 52V, 54V joins with the module channels and with the corresponding horizontal wall. The joints are made by welding each horizontal/vertical wall pair together and to the inner vertical flanges of the module channels.

At the location of each filler, a respective fastener comprising a bolt 56, a steel spacer 57, and a nut 58 fastens the module to the frame. Spacer 57 has an outer perimeter, preferably circular, that fits as closely as manufacturing tolerances will allow, to a circular through-hole 59 in the respective inner vertical flange, 44R, 44L. At its center, spacer 57 has a circular through-hole 61.

The threaded shank of each bolt 56 passes through through-hole 61 and aligned horizontal through-holes 63, 65, and 67 respectively in the respective filler, in the vertical wall of the respective side rail, and in the outer vertical flange of the respective module channel to protrude beyond the latter. A nut 58 is threaded onto the protruding end of the bolt shank and tightened to cause the fastener to fasten the module channel, the side rail channel, and the filler together in horizontal compression.

Spacer 57 has two important structural functions: 1) it allows the fastener (nut and bolt) to horizontally compress the filler, the vertical wall of the frame rail and the outer vertical flange of the module channel; while 2) constraining the fastener against two dimensional motion in a vertical plane parallel to the lengths of the side rails because it is dimensioned to have as close a fit as possible in hole 59. These functions allow the frame rails to be forced against the outer flanges of the module channels free of interference by the inner flanges of the module, while the close fit of the spacer outer perimeters to the through-holes in the inner flanges constrains the inner flanges from movement in the planes of the spacers. It is to be appreciated that the fastening could be reversed by providing the through-holes to which the spacers fit in the outer flanges of the module channels and forcing the side rails and fillers against the inner vertical flanges of the module channels.

The module channels, the frame side rails, and the fillers are dimensioned to have close fits that are as close as tolerances will allow, thereby creating what is essentially immovable attachment of the module to the frame with the module properly aligned to the centerline of the frame. Because the axles are pre-aligned with the module channels during fabrication of the module, the association of the module channels with the side rails and their subsequent fastening secures proper axle alignment in the vehicle chassis.

Apart from securing desired axle alignment to the frame, the sub-frame also functions as a cross member of the frame, imparting rigidity to the frame with a significantly smaller number of parts and fastening operations when compared with commonly manufactured frames. Only four fasteners are used in the illustrated embodiment.

Fillers 48R, 48L have through-holes 60 running lengthwise of the frame side rails to provide passage for one or more of electrical, fluid, and pneumatic lines through them.

While the relationship of the modular axle assembly to the frame provides efficient assembly of the module to a truck chassis, it also provides for efficient disassembly of electrical, fluid, and pneumatic lines for service when needed. The invention permits rapid rear module changes by authorized service centers, interested in offering rebuilt rear module cores. The inventors have further recognized that this capability also provides module interchangeability, and as such can offer new business opportunities to truck manufacturers and truck dealers as explained by the following example.

If a manufacturer or dealer has an existing truck in its inventory that would meet a prospective customer's need except for its particular drive axle, the truck can be quickly adapted to meet the customer's requirement by replacing the rear drive axle module with one that does meet the customer's needs. To accomplish this, different module models are stocked in inventory, either on a manufacturer's or dealer's premises or in a warehouse from which the appropriate module can be quickly delivered to the manufacturer or dealer.

An existing module on a truck is removed simply by elevating the rear end of the chassis, disconnecting the drive shaft coming from the transmission, disconnecting various lines, conduits, etc. so that they do not interfere with the module, removing the fasteners while supporting the module, and then lowering module so that the module channels 40R, 40L are clear of the frame side rails 22, 24. The module is then moved out of the way.

The replacement module is positioned underneath the elevated rear of the chassis, and from there it is elevated to fit its channels to the frame side rails, or else the chassis is lowered onto the module. The fasteners are re-installed, the driveshaft is re-connected, and other connections made as necessary. With the replacement module installed, the rear of the truck is lowered, and the truck is ready to be driven.

Consequently, the ability to quickly adapt a truck in this way can enable a manufacturer or dealer to make a sale or lease that it otherwise would not. The customer benefits by not having to wait for a new truck to be built at an assembly plant. Customers may wish to purchase more than one rear axle module when investing in a highway tractor. This will permit them to accommodate various work tasks with the same tractor by changing modules.

While a presently preferred embodiment of the invention has been illustrated and described, it should be appreciated that principles of the invention apply to all embodiments falling within the scope of the following claims.

What is claimed is:

1. A method of assembling a rear axle module to a chassis frame that has right and left side rail channels running lengthwise of the chassis frame, each of the right and left side rail channels having an interior bounded by a vertical wall and horizontal top and bottom flanges that extend from top and bottom of the vertical wall toward corresponding flanges of an opposite side rail, the method comprising:

filling interiors of side rails with fillers;

positioning the right and left side rail channels of the rear axle module below right and left side rails and relatively moving the module and frame toward each other to cause an interior of each channel of the module that is bounded by a bottom wall and inner and outer upright flanges to fit to a corresponding side rail with the bottom wall of each module channel being disposed against the bottom flanges of the corresponding side rail and with the inner flanges of each module channel disposed against free ends of flanges of a respective side rail and a corresponding filler and with the outer flange of each module channel disposed against the vertical wall of the respective side rail;

and fastening each module channel, a respective side rail channel, and a respective filler together in horizontal compression.

2. A method as set forth in claim 1 wherein fastening comprises tightening a fastener that passes horizontally through aligned holes in each of the respective right and left side rail channels, the respective module channel, and the respective filler.

3. A method as set forth in claim 1 wherein assembly of the rear axle module to the chassis frame is performed in a chassis assembly plant where new chassis are assembled, the rear axle module comprises at least one axle, and the rear axle module is delivered new to the assembly plant with its at least one axle assembled in pre-alignment with the channels of the module.

4. A method as set forth in claim 1 wherein assembly of the rear axle module to the chassis frame is performed at a dealer's facility where the rear axle module is selected from an inventory of various models of rear axle module.

5. A method of swiftly re-equipping a truck that has one particular model of rear drive axle/suspension module with a replacement model, the method comprising:

stocking different rear drive axle/suspension module models in inventory;

selecting a replacement axle/suspension module model from the inventory;

removing the one particular model of module from the truck by unfastening from a chassis frame of the truck a sub-frame structure of that module from which the suspension suspends one or more axles, and removing the unfastened module from the chassis frame;

and installing the replacement axle/suspension module model by placing a sub-frame of the replacement model on the chassis frame of the truck in the same position formerly occupied by the sub-frame of the removed module and fastening the sub-frame of the replacement model to the chassis frame at the same locations where the sub-frame of the removed module was fastened to the chassis frame, wherein the step of installing the replacement axle/suspension module model comprises positioning right and left channels of the replacement model sub-frame below right and left side rails respectively of the chassis frame and relatively moving the replacement module and frame toward each other to cause an interior of each channel of the replacement module that is bounded by a bottom wall and inner and outer upright flanges to fit to the corresponding side rail with the bottom wall of each module channel being disposed against a bottom flange of the corresponding side rail and with the inner flange of each module channel disposed against free ends of flanges of the respective side rail and a filler that is within the interior of the side rail and with the outer flange of each channel of the replacement module disposed against a vertical wall of the respective side rail, and fastening each channel of the replacement module to the respective side rail to fasten the respective side rail, the respective channel of the replacement module, and the respective filler together in horizontal compression.

* * * * *